(12) United States Patent
Tomeba et al.

(10) Patent No.: US 9,820,163 B2
(45) Date of Patent: *Nov. 14, 2017

(54) BASE STATION APPARATUS, TERMINAL APPARATUS, AND COMMUNICATION METHOD

(71) Applicant: Sharp Kabushiki Kaisha, Sakai, Osaka (JP)

(72) Inventors: Hiromichi Tomeba, Sakai (JP); Jungo Goto, Sakai (JP); Osamu Nakamura, Sakai (JP); Shiro Wakahara, Sakai (JP); Yasuhiro Hamaguchi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 0 days.

This patent is subject to a terminal disclaimer.

(21) Appl. No.: 15/318,041

(22) PCT Filed: May 29, 2015

(86) PCT No.: PCT/JP2015/065509
§ 371 (c)(1),
(2) Date: Dec. 12, 2016

(87) PCT Pub. No.: WO2015/190315
PCT Pub. Date: Dec. 17, 2015

(65) Prior Publication Data
US 2017/0111801 A1    Apr. 20, 2017

(30) Foreign Application Priority Data

Jun. 13, 2014 (JP) ................. 2014-122302

(51) Int. Cl.
*H04W 16/14* (2009.01)
*H04W 72/04* (2009.01)
(Continued)

(52) U.S. Cl.
CPC .......... *H04W 16/14* (2013.01); *H04W 72/042* (2013.01); *H04W 72/0446* (2013.01); *H04W 88/02* (2013.01); *H04W 88/10* (2013.01)

(58) Field of Classification Search
CPC ........... H04W 72/042; H04W 72/0453; H04W 88/02; H04W 16/14; H04W 72/00;
(Continued)

(56) References Cited

U.S. PATENT DOCUMENTS

| 2014/0079016 | A1 | 3/2014 | Dai et al. |
| 2015/0236829 | A1 | 8/2015 | Ratasuk et al. |
| 2017/0105124 | A1* | 4/2017 | Tomeba ............... H04W 16/14 |

FOREIGN PATENT DOCUMENTS

| JP | 2014-502453 A | 1/2014 |
| WO | 2014/035415 A1 | 3/2014 |

OTHER PUBLICATIONS

Official Communication issued in International Patent Application No. PCT/JP2015/065509, dated Jul. 7, 2015.
(Continued)

*Primary Examiner* — Olumide T Ajibade Akonai
(74) *Attorney, Agent, or Firm* — Keating & Bennett, LLP

(57) ABSTRACT

There are provided a base station apparatus, a terminal apparatus, and a communication method which are capable of realizing a LTE-A system with improved throughput by performing a CA technology including an unlicensed band while suppressing interference from an existing system. A base station apparatus according to the present invention is a base station apparatus which is included in a communication system that applies a communication scheme applied to a first frequency band capable of being used as a dedicated frequency band to a second frequency band different from the first frequency band and is capable of communicating with a terminal apparatus by using the second frequency band and the second frequency band. The base station
(Continued)

apparatus synchronizes a frame number of a frame of a first signal transmitted using the first frequency band with a frame number of a frame of a second signal irrespective of whether or not the second signal transmitted using the second frequency band is transmitted.

8 Claims, 9 Drawing Sheets

(51) Int. Cl.
*H04W 88/10* (2009.01)
*H04W 88/02* (2009.01)

(58) Field of Classification Search
CPC .......... H04W 72/0446; H04W 72/1289; H04L 5/001; H04L 5/0053; H04L 5/0092; H04L 5/0094; H04L 5/0048; H04L 45/245; H04L 5/0098
See application file for complete search history.

(56) References Cited

OTHER PUBLICATIONS

Ericsson et al., "Study on Licensed-Assisted Access using LTE", 3GPP TSG RAN Meeting #63, RP-140259, Mar. 3-6, 2014, 7 pages.
Tomeba, H. et al.; "Base Station Apparatus, Terminal Apparatus, and Communication Method"; U.S. Appl. No. 15/318,019, filed Dec. 12, 2016.

* cited by examiner

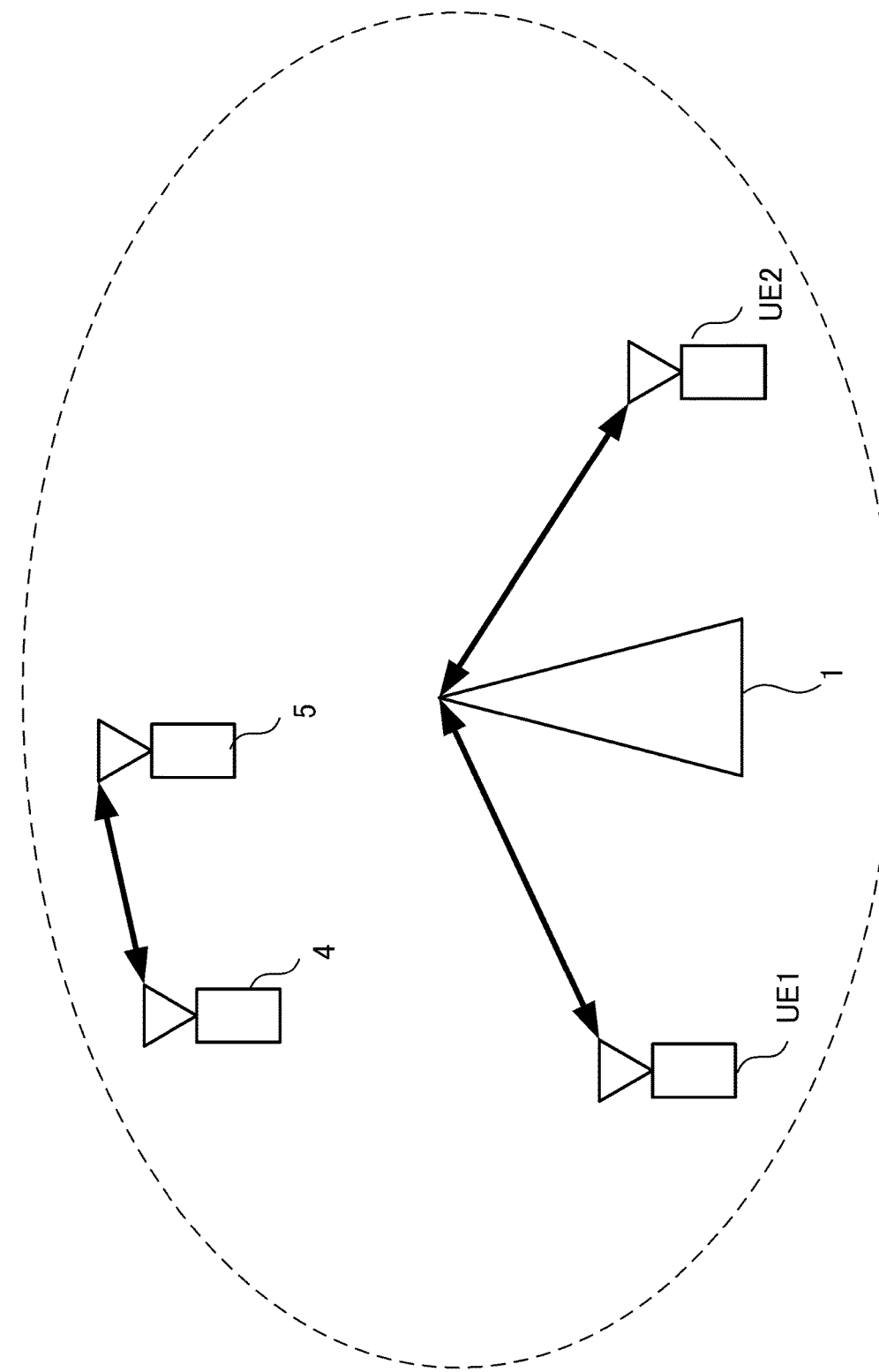

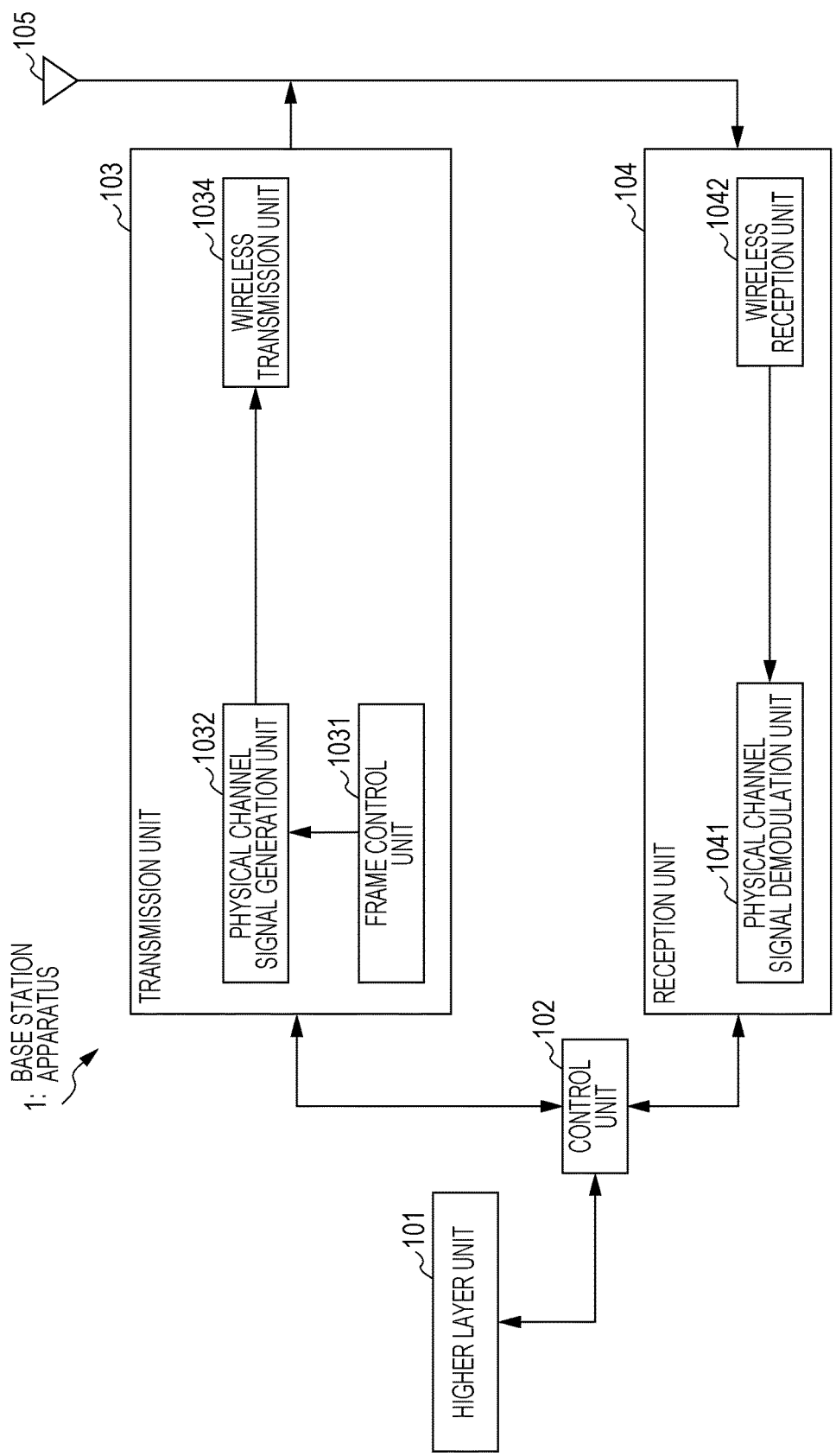

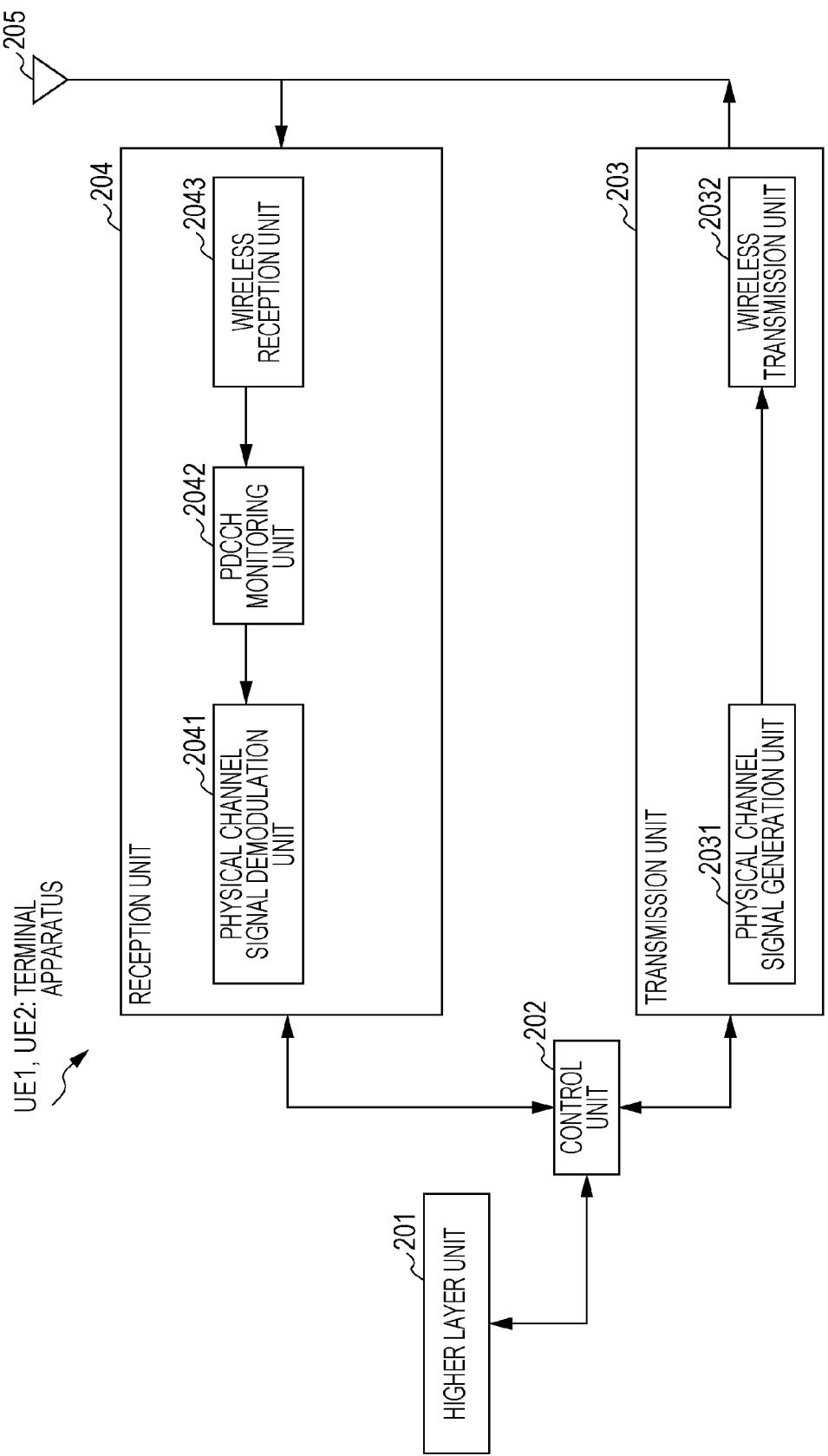

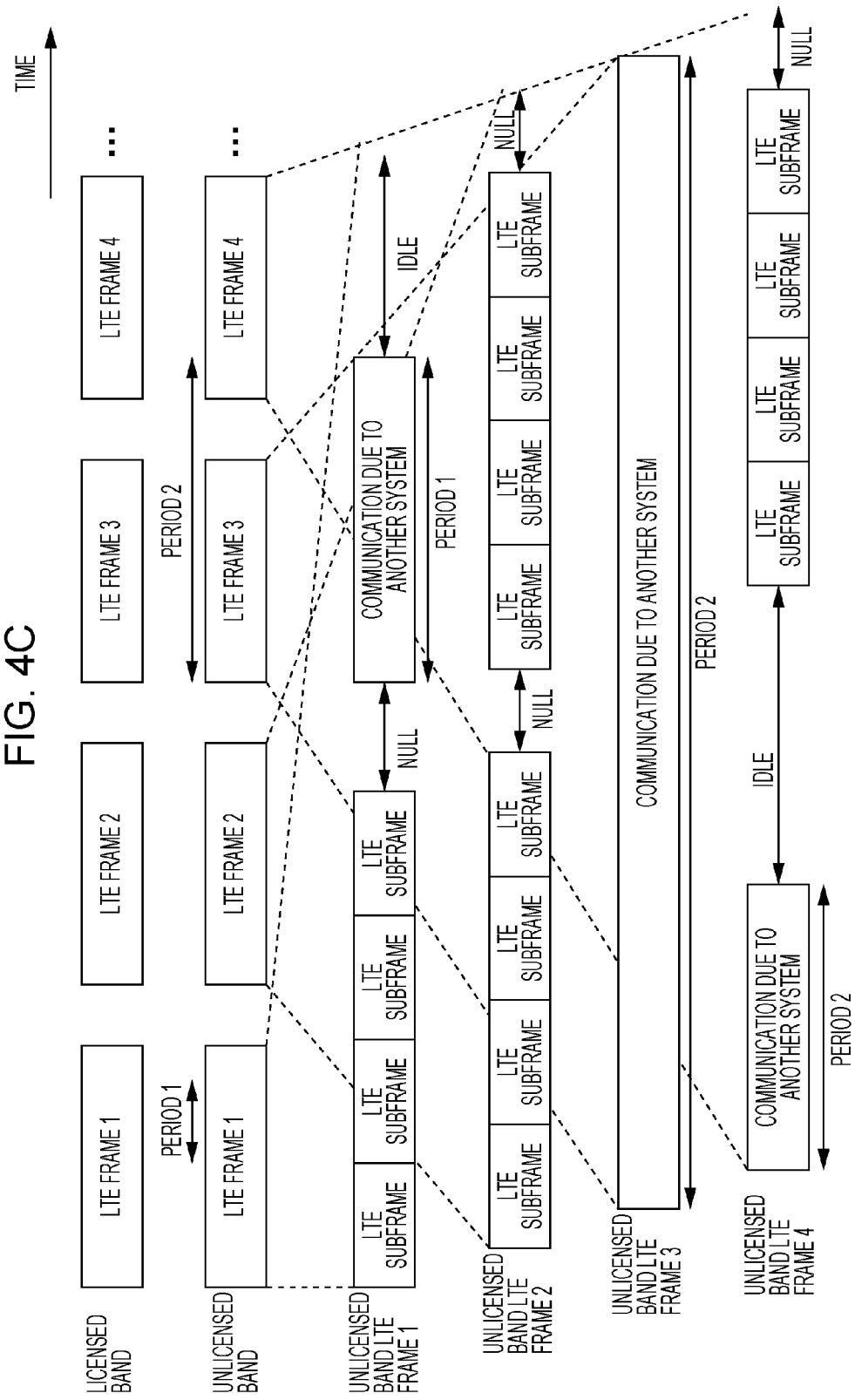

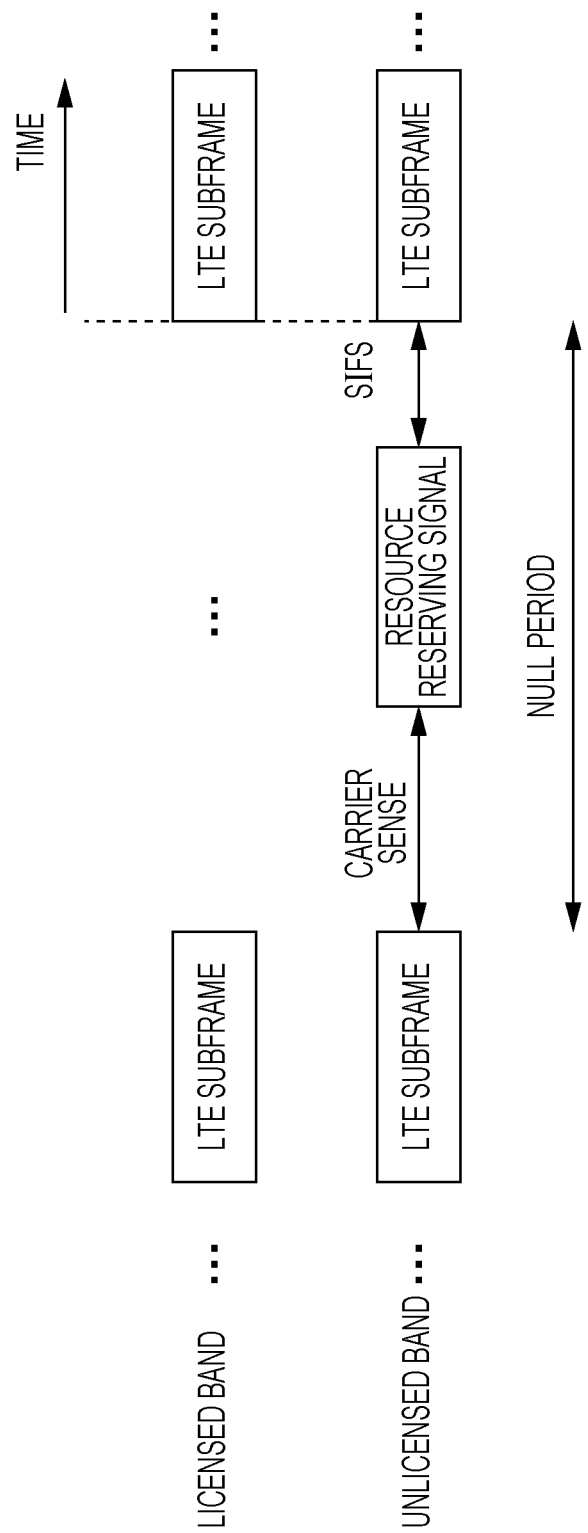

BASE STATION APPARATUS, TERMINAL APPARATUS, AND COMMUNICATION METHOD

TECHNICAL FIELD

The present invention relates to a base station apparatus, a terminal apparatus, and a communication method.

BACKGROUND ART

The standardization of a Long Term Evolution (LTE) system which is a wireless communication system of 3.9G mobile phones has been completed, and the standardization of LTE-Advanced (LTE-A) (also referred to as IMT-A) system which is an enhancement of the LTE system as one of 4G wireless communication systems is being currently performed.

In the LTE-A system (from LTE Rel. 10 on), a carrier aggregation (CA) technology of using one system band of the LTE system as a component carrier (CC) (also referred to as a serving cell) and simultaneously using a plurality of CCs has been adopted. In a case where CA is performed, one CC is used as a primary cell (Pcell) capable of realizing all functions, and other CCs are used as a secondary cell (Scell).

Reserving frequency resources while coping with a rapid increase in data traffic in the LTE system is an important issue. A frequency band assumed for the LTE system so far has been a frequency band referred to as a so-called licensed band permitted for use by a country or a locality in which a radio communication operator provides services, and has limitations in an available frequency band.

Thus, the provision of an LTE system that uses a frequency band referred to as a so-called unlicensed band which does not require permission for use by a country or a locality has been recently discussed (see NPL 1). The CA technology adopted by the LTE-A system is also applied to an unlicensed band, and thus, it is expected that the LTE-A system will be able to cope with a rapid increase in data traffic with high efficiency.

CITATION LIST

Non Patent Literature

NPL 1: RP-140259, "Study on Licensed-Assisted Access using LTE," 3GPPTSG RAN Meeting #63, March 2014.

SUMMARY OF INVENTION

Technical Problem

However, in an unlicensed band, as represented by an IEEE 802.11 system, communication is likely to be performed by a radio access technology (RAT) different from LTE. Accordingly, if the LTE-A system simply applies the CA technology to the unlicensed band, throughput may deteriorate due to interference from another system.

The present invention has been made in view of such circumstances, and it is an object of the invention to provide a base station apparatus, a terminal apparatus, and a communication method which are capable of realizing a LTE-A system with improved throughput by implementing a CA technology including an unlicensed band while suppressing interference from an existing system.

Solution to Problem

A base station apparatus, a terminal apparatus, and a communication method according to the present invention for solving the above-described problems are as follows.

(1) That is, a base station apparatus according to the present invention is a base station apparatus which is included in a communication system that applies a communication scheme applied to a first frequency band capable of being used as a dedicated frequency band to a second frequency band different from the first frequency band and is capable of communicating with a terminal apparatus by using the second frequency band and the second frequency band. The base station apparatus synchronizes a frame number of a frame of a first signal transmitted using the first frequency band with a frame number of a frame of a second signal irrespective of whether or not the second signal transmitted using the second frequency band is transmitted.

(2) In accordance with the base station apparatus according to the present invention, in the base station apparatus described in (1), at least signal null periods are included in the frame of the second signal transmitted using the second frequency band, and a frame length of a signal frame included in the frame of the second signal transmitted using the second frequency band is less than a frame length of a signal frame included in the frame of the first signal transmitted using the first frequency band.

(3) In accordance with the base station apparatus according to the present invention, in the base station apparatus described in (2), a plurality of frequency bands is included in the second frequency band, and the frame of the second signal is constituted depending on performance of the plurality of frequency bands.

(4) In accordance with the base station apparatus according to the present invention, in the base station apparatus described in (3), priority levels for applying the communication scheme are assigned to the plurality of frequency bands.

(5) In accordance with the base station apparatus according to the present invention, in the base station apparatus described in any one of (2) to (4), a utilization status of the second frequency band is measured during at least a part of null periods, a frame structure of the second signal is changed on the basis of the measurement result, and information indicating the change of the frame structure is signaled to the terminal apparatus.

(6) In accordance with the base station apparatus according to the present invention, in the base station apparatus described in any one of (2) to (4), a utilization status of the plurality of frequency bands is measured during at least a part of the null periods, a frequency band to be used, among the plurality of frequency bands, are determined on the basis of the measurement result, and information indicating the plurality of frequency bands to be used is signaled to the terminal apparatus.

(7) In accordance with the base station apparatus according to the present invention, in the base station apparatus described in any one of (2) to (4), a frequency band that is not capable of being used as the dedicated frequency band by the communication system is included in the second frequency band.

(8) A terminal apparatus according to the present invention is a terminal apparatus which is included in a communication system that applies a communication scheme applied to a first frequency band capable of being used as a dedicated frequency band to a second frequency band different from the first frequency band and is capable of communicating with a base station apparatus by using the second frequency band and the second frequency band. The terminal apparatus: receives a frame number of a frame of a first signal transmitted using the first frequency band and a frame number of a frame of a second signal transmitted using the second frequency band from the base station apparatus; and performs monitoring of control signals which are included in the first signal and the second signal and are based on the communication scheme, on the basis of the reception.

(9) In accordance with the terminal apparatus according to the present invention, in the terminal apparatus described in (8), a plurality of frequency bands is included in the second frequency band, and monitoring of a control signal based on the communication scheme is performed in at least one frequency band of the plurality of frequency bands.

(10) In accordance with the terminal apparatus according to the present invention, in the terminal apparatus described in (9), information indicating the second frequency band to which the first communication scheme is applied is signaled from the base station apparatus, and the monitoring in the frequency band which is not capable of being used as the dedicated frequency band is started on the basis of the signaling.

(11) In accordance with the terminal apparatus according to the present invention, in the terminal apparatus described in any one of (8) to (10), a frequency band that is not capable of being used as the dedicated frequency band by the communication system is included in the second frequency band.

(12) A communication method according to the present invention is a communication method used in a base station apparatus which is included in a communication system that applies a communication scheme applied to a first frequency band capable of being used as a dedicated frequency band to a second frequency band different from the first frequency band and is capable of communicating with a terminal apparatus by using the second frequency band and the second frequency band. The communication method includes: a step of synchronizing a frame number of a frame of a first signal transmitted using the first frequency band with a frame number of a frame of a second signal irrespective of whether or not the second signal transmitted using the second frequency band is transmitted.

(13) A communication method according to the present invention is a communication method used in a terminal apparatus which is included in a communication system that applies a communication scheme applied to a first frequency band capable of being used as a dedicated frequency band to a second frequency band different from the first frequency band and is capable of communicating with a base station apparatus by using the second frequency band and the second frequency band. The communication method includes: a step of receiving a frame number of a frame of a first signal transmitted using the first frequency band and a frame number of a frame of a second signal transmitted using the second frequency band; and a step of performing monitoring of control signals which are included in the first signal and the second signal and are based on the communication scheme, on the basis of the frame numbers.

Advantageous Effects of Invention

According to the present invention, a CA technology using an unlicensed band is realized in addition to a licensed band while minimizing interference from an existing system. As a result, it is possible to improve the throughput of a communication system.

BRIEF DESCRIPTION OF DRAWINGS

FIG. 1 is a diagram illustrating an example of a communication system according to the present invention.

FIG. 2 is a schematic block diagram illustrating a structure example of a base station apparatus according to the present invention.

FIG. 3 is a schematic block diagram illustrating a structure example of a terminal apparatus according to the present invention.

FIG. 4C is a diagram illustrating an example of the frame structure of the signal according to the present invention.

FIG. 6 is a diagram illustrating an example of the frame structure of the signal according to the present invention.

DESCRIPTION OF EMBODIMENTS

[First Embodiment]

Figure 4A:
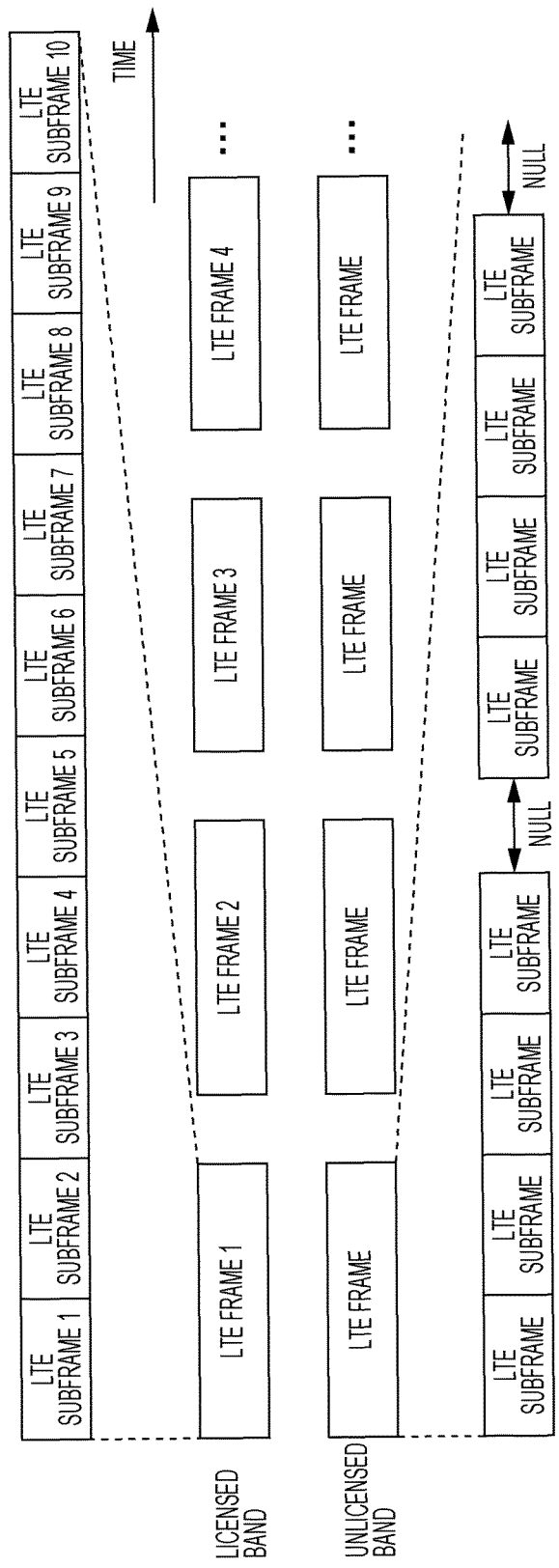
FIG. 4A is a diagram illustrating an example of a frame structure of a signal according to the present invention.

A communication system according to the present embodiment includes a base station apparatus (transmission apparatus, cell, transmission point, transmit antenna group, transmit antenna port group, component carrier, or evolved Node B (eNB)), a terminal apparatus (terminal, mobile terminal, reception point, reception terminal, reception apparatus, receive antenna group, receive antenna port group, or user equipment (UE)).

FIG. 1 is a schematic diagram illustrating an example of a downlink of a cellular system according to a first embodiment of the present invention. In the cellular system of FIG. 1, a base station apparatus (eNB) 1 of a wide coverage (cell radius is large) is present, and a terminal apparatus UE1 and a terminal apparatus UE2 which are coupled with the base station apparatus 1 are present. It is assumed that a station (STA) 4 and a STA 5 which perform the existing 802.11 communication are also present in the coverage range of the base station apparatus 1, and it is assumed that the STA 4 and the STA 5 are likely to perform communication on the basis of IEEE 802.11 system (hereinafter, simply referred to as 802.11 system) in unlicensed band. Here, the unlicensed band refers to a frequency band in which a radio communication operator can provide services without gaining permission for use by a country or a locality. That is, the unlicensed band is a frequency band in which a specific radio communication operator is not able to exclusively use. Downlink transmission will be mainly described below, but a method according to the present embodiment may also be applied to transmission (uplink) from each terminal apparatus to the base station apparatus 1.

It is assumed that the terminal apparatus UE1 and the terminal apparatus UE2 are coupled with one of the component carriers for communicating with the base station apparatus 1, as a primary cell (Pcell) and a frequency band to be used is a licensed band. Here, the licensed band refers to a frequency band permitted for use by a country or a locality in which a radio communication operator provides services. That is, the licensed band is a frequency band in which a specific radio communication operator can exclusively use.

The base station apparatus 1 according to the present embodiment performs data communication with the terminal apparatus UE1 and the terminal apparatus UE2 through the CA using a part of the unlicensed band as a secondary cell (Scell). Thus, the terminal apparatus UE1 and the terminal apparatus UE2 may perform monitoring of a physical downlink control channel (PDCCH) or an enhanced physical downlink control channel (EPDCCH) through which the base station apparatus 1 transmits control information of downlink data transmission in the unlicensed band in addition to the licensed band. The monitoring of the PDCCH includes a synchronization process and a blind decoding process for a search space in order to decode downlink control information (DCI) which is information related to downlink control.

FIG. 2 is a block diagram illustrating a structure example of the base station apparatus 1 according to the first embodiment of the present invention. As illustrated in FIG. 2, the base station apparatus 1 includes a higher layer unit 101, a control unit 102, a transmission unit 103, a reception unit 104, and an antenna 105.

The higher layer unit 101 performs processes of a medium access control (MAC) layer, a packet data convergence protocol (PDCP) layer, a radio link control (RLC) layer and a radio resource control (RRC) layer. The higher layer unit 101 generates information for controlling the transmission unit 103 and the reception unit 104, and outputs the generated information to the control unit 102. The higher layer unit 101 may generate information for signaling a frame structure of a signal configured by a frame control unit 1031, to be described below, to each terminal apparatus.

The transmission unit 103 includes the frame control unit 1031, a physical channel signal generation unit 1032, and a wireless transmission unit 1034. The frame control unit 1031 determines a frame structure of a signal generated by the physical channel signal generation unit 1032 on the basis of an instruction from the control unit 102. The operation details of the frame control unit 1031 will be described below.

The physical channel signal generation unit 1032 generates a baseband signal transmitted to the terminal apparatus UE1 and the terminal apparatus UE2 by the base station apparatus 1 in the Pcell and the Scell on the basis of the frame structure determined by the frame control unit 1031. The signal generated by the physical channel signal generation unit 1031 includes signals transmitted through the PDCCHs of the Pcell and the Scell and a physical downlink shared channel (PDSCH) through which downlink data is transmitted. Since the number of terminal apparatuses is 2 in FIG. 1, the example in which the baseband signals transmitted to the terminal apparatus UE1 and the terminal apparatus UE2 are generated is illustrated, but the present embodiment is not limited thereto.

The wireless transmission unit 1034 performs a process of converting the baseband signal generated by the physical channel signal generation unit 1032 into a signal of a radio frequency (RF) band. The process performed by the wireless transmission unit 1034 includes digital-to-analog conversion, filtering, and frequency conversion for converting the baseband into the RF band.

The antenna 105 transmits the signal generated by the transmission unit 103 to the terminal apparatus UE1 and the terminal apparatus UE2.

The base station apparatus 1 has a function of receiving signals transmitted from the terminal apparatus UE1 and the terminal apparatus UE2. The antenna 105 receives the signals transmitted from the terminal apparatus UE1 and the terminal apparatus UE2, and outputs the received signal to the reception unit 104.

The reception unit 104 includes a physical channel signal demodulation unit 1041, and a wireless reception unit 1042. The wireless reception unit 1042 converts a signal of the RF band input from the antenna 105 into the signal of the baseband. The process performed by the wireless reception unit 1042 includes frequency conversion for converting the RF band into the baseband, filtering, and analog-to-digital conversion. The process performed by the reception unit 104 may have a function (for example, carrier sense or listen before talk (LBT)) of measuring an ambient interference and reserving the radio resource (including a time resource, a frequency resource, and a spatial resource).

The physical channel signal demodulation unit 1041 demodulates the signal of the baseband output by the wireless reception unit 1042. The signal demodulated by the physical channel signal demodulation unit 1041 includes signals transmitted through a physical uplink control channel (PUCCH) through which the terminal apparatus UE1 and the terminal apparatus UE2 transmit control information of uplink data transmission and a physical uplink shared channel (PUSCH) through which the terminal apparatuses transmit uplink data. The physical channel signal demodulation unit 1041 may demodulate the uplink data transmitted through the PUSCH on the basis of control information which is transmitted through the PDCCH and is related to the uplink. The physical channel signal demodulation unit 1041 may have a carrier sense function.

FIG. 3 is a block diagram illustrating a structure example of the terminal apparatus UE1 and the terminal apparatus UE2 according to the present embodiment. As illustrated in FIG. 3, the terminal apparatus UE1 and the terminal apparatus UE2 include a higher layer unit 201, a control unit 202, a transmission unit 203, a reception unit 204, and an antenna 205.

The higher layer unit 201 performs the processes of the MAC layer, the PDCP layer, the RLC layer, and the RRC layer. The higher layer unit 201 generates information for controlling the transmission unit 203 and the reception unit 204, and outputs the generated information to the control unit 202.

The antenna 205 receives the signal transmitted from the base station apparatus 1, and outputs the received signal to the reception unit 204. It is assumed in the following description that the number of antennas 205 included in the terminal apparatus UE1 and the terminal apparatus UE2 is one in the transmission and reception, but the terminal apparatus UE1 and the terminal apparatus UE2 may use a plurality of antennas in the transmission and reception. The terminal apparatus UE1 and the terminal apparatus UE2 may include an antenna used in the transmission and reception for every frequency band. The same is true of the antenna 204 included in the base station apparatus 1.

The reception unit 104 includes a physical channel signal demodulation unit 2041, a PDCCH monitoring unit 2042, and a wireless reception unit 2043. The wireless reception unit 2043 converts the signal of the RF band input from the antenna 205 into the signal of the baseband. The process performed by the wireless reception unit 2043 includes frequency conversion for converting the RF band into the baseband, filtering, and analog-to-digital conversion.

The PDCCH monitoring unit 2042 performs monitoring of the PDCCH or the EPDCCH on the signal of the baseband output from the wireless reception unit 2043, and acquires the control information transmitted from the base station apparatus 1 through the PDCCH or the EPDCCH. The PDCCH monitoring unit 2042 may perform the synchronization process on the basis of a signal (for example, primary synchronization signal (PSS) or secondary synchronization signal (SSS)) of a synchronization channel transmitted from the base station apparatus 1.

The physical channel signal demodulation unit 2041 demodulates the signal of the baseband output from the wireless reception unit 2043 on the basis of the control information acquired by the PDCCH monitoring unit 2042. The signal demodulated by the physical channel signal demodulation unit 2041 includes a signal transmitted from the base station apparatus 1 through the PDSCH. The physical channel signal demodulation unit 2041 may demodulate the downlink data transmitted through the PDSCH on the basis of the DCI transmitted through the PDCCH.

The terminal apparatus UE1 and the terminal apparatus UE2 have a function of transmitting a signal. The antenna 205 transmits the signal of the RF band generated by the transmission unit 203 to the base station apparatus 1.

The transmission unit 203 includes a physical channel signal generation unit 2031, and a wireless transmission unit 2032. The physical channel signal generation unit 2031 generates the signal of the baseband transmitted to the base station apparatus 1 from the terminal apparatus UE1 and the terminal apparatus UE2. The signal generated by the physical channel signal generation unit 2031 includes signals transmitted from the terminal apparatus UE1 and the terminal apparatus UE2 through the PUCCH and the PUSCH.

The wireless transmission unit 2032 converts the signal of the baseband generated by the physical channel signal generation unit 2031 into the signal of the RF band. The process performed by the wireless transmission unit 2032 includes digital-to-analog conversion, filtering, and frequency conversion for converting the baseband into the RF band.

In the present embodiment, it is considered that the base station apparatus 1 performs the carrier aggregation (CA) on the terminal apparatus UE1 and the terminal apparatus UE2 using a part of the unlicensed band as the secondary cell (Scell). However, if the communication system continuously occupies the unlicensed band on the basis of the LTE system, another apparatus that performs communication by another existing communication system represented by the 802.11 system may not perform the communication in the unlicensed band. The base station apparatus 1 is not able to perform the carrier sense in this frequency band while performing communication using a part of the unlicensed band as the Scell.

Thus, the frame control unit 1031 of the base station apparatus 1 according to the present embodiment controls such that a signal transmitted in the Scell and a signal transmitted from the base station apparatus 1 in the Pcell based on the LTE system have different frame structures.

FIG. 4A is a diagram illustrating an example of a frame structure configured by the frame control unit 1031 according to the present embodiment. A frame (LTE frame) based on the LTE system includes 10 subframes (LTE subframes) each having a length of 1 millisecond (ms), and has a length of 10 ms. In the present embodiment, the signal transmitted from the base station apparatus 1 in the Pcell of the licensed band has the frame structure of the LTE system.

Meanwhile, in the present embodiment, in the frame structure of the signal transmitted from the base station apparatus 1 in the Scell of the unlicensed band, a frame length is 10 ms which is the same as that of the LTE frame, and the number of subframes constituting the frame is less than 10. That is, the frame control unit 1031 assigns a no-signal period (period expressed as null in FIG. 4) during which there is no signal to the frame of the signal transmitted from the base station apparatus 1 in the Scell of the unlicensed band. The number of subframes constituting the frame is not a natural number, and may be a number expressed by a radix point, such as "8.5 frame". The frame control unit 1031 controls such that a total period of the period during which the LTE subframes are allocated and the no-signal period is the same as the frame length of the LTE frames transmitted from the base station apparatus 1 in the Pcell of the licensed band. That is, the frame length of the signal of the Scell configured by the frame control unit 1031 is constantly a predetermined length (for example, 10 ms), and the frame length of the signal is not present in the number of LTE subframes included in the frame of one signal, the length of the no-signal period, or the position to be allocated. The frame control unit 1031 configures such a frame structure, and thus, each apparatus including the base station apparatus 1, which is included in the communication system, can perform the carrier sense during the null period. For example, the STA 4 or the STA 5 can start the communication on the basis of an access scheme called carrier sense multiple access with collision avoidance (CSMA/CA).

As the method of causing the base station apparatus 1 to assign the null period to the frame of the signal transmitted in the Scell, the frame control unit 1031 may control such that the frame of the signal transmitted in the Scell includes a plurality of signal frames and null frames. Here, it is assumed that the null frame is the frame that does not include the signal. It is assumed that the signal frame is the frame (for example, LTE subframe) that includes the signal. The null frame length is not limited to any length, and, for example, the frame control unit 1031 may set the null frame length and the LTE subframe length to be the same. The frame control unit 1031 configures the frame of the signal transmitted in the Scell such that a total period of the plurality of LTE subframes and the null frames is the same as the LTE frame length transmitted from the base station apparatus 1 in the Pcell of the licensed band. The null period is not necessarily configured for the last LTE frame, and may be configured for the leading LTE frame.

The no-signal period in the present embodiment includes a case where each apparatus transmits the signal with a transmit power or a channel structure such that the signal transmitted from each apparatus is received with the following received power which is equal to or less than a prescribed power (for example, carrier sense level) by an apparatus other than this base station apparatus in the radio resource in addition to a case where each apparatus completely stops transmitting the signal. For example, the base station apparatus 1 may control such that only the signal (for example, PSS or SSS) of the synchronization channel is transmitted in the no-signal period. The base station apparatus 1 may control such that only the system information (for example, a broadcast information transmitted from the base station apparatus 1 in physical broadcast channel (PBCH) or Beacon frame used in the IEEE 802.11 system) of this base station apparatus is transmitted in the no-signal period.

The base station apparatus 1 may control such that the signal of the synchronization channel such as the PSS or the SSS is not transmitted in the Scell of the unlicensed band and the signal of the synchronization channel such as the PSS or the SSS is transmitted in the Pcell of the licensed band in the no-signal period.

Although it has been described in FIG. 4A that a null period of 1 ms is provided for every four subframes, that is, every 4 ms, the length of the null period or the number of subframes until reaching the null period is not limited to the method illustrated in FIG. 4A. However, the length of the null period is appropriately an integral multiple of the subframe length, but is not limited thereto. The frame control unit 1031 may periodically assign the null period to the frame of the signal of the Scell, or may adaptively assign the null period on the basis of the traffic amount of the communication system.

The higher layer unit 101 may add the frame structure of the signal which is configured by the frame control unit 1031 and is transmitted in the Scell of the unlicensed band to the higher layer signal such as a radio resource control (RRC) signal which is addressed to each terminal apparatus. The higher layer unit 101 may be operated such that information indicating the plurality of frame structures that is likely to be configured by the frame control unit 1031 is previously signaled to each terminal apparatus, or the higher layer unit 101 may be operated such that information indicating priorities configured for the plurality of subframe structures by the frame control unit 1031 is previously signaled to each terminal apparatus. The base station apparatus 1 may add information indicating the frame structure among the plurality of frame structures signaled to each terminal apparatus from the higher layer unit 101, which is used by the frame control unit 1031 in reality to another control information (for example, control information transmitted in the PDCCH and the EPDCCH of the Pcell and the Scell). The control information may be information indicating the position of the null period assigned to the frame of the signal transmitted by the frame control unit 1031 in the Scell of the unlicensed band, or may be information indicating the position of the LTE subframe transmitted in this frame.

The base station apparatus 1 may not explicitly notify each terminal apparatus of the frame structure configured by the frame control unit 1031. For example, the terminal apparatus UE1 and the terminal apparatus UE2 may recognize information (for example, cell ID) indicating the base station apparatus 1 to which this base station apparatus is coupled from the another signal (for example, the signal transmitted in the PSS or the SSS) transmitted from the base station apparatus 1. In this case, the frame structure configured by the frame control unit 1031 is previously associated with the cell ID, and thus, the terminal apparatus UE1 and the terminal apparatus UE2 may recognize the frame structure configured by the frame control unit 1031. The base station apparatus 1 may previously signal a table indicating the relationship between the frame structure configured by the frame control unit 1031 and the cell ID to each terminal apparatus.

The wireless reception unit 1042 or the physical channel signal demodulation unit 1041 may perform the carrier sense during the null period. The frame control unit 1031 may change the frame structure on the basis of the result of the carrier sense. For example, in a case where the unlicensed band is not able to be reserved through the carrier sense, the frame control unit 1031 may set the period of the LTE subframe subsequent to the null period as the null period.

In a case where the frame control unit 1031 adds a null to the frame of the signal of the Scell on the basis of the result of the carrier sense, the base station apparatus 1 may signal the frame structure configured by the frame control unit 1031 to each terminal apparatus again by the signal of the higher layer or the control information transmitted through the PDCCH. In a case where the base station apparatus 1 signals the frame structure configured by the frame control unit 1031 by the control information transmitted through the PDCCH, the base station apparatus may signal only differential information from the frame structure previously notified to each terminal apparatus through the signaling of the higher layer.

The frame control unit 1031 may apply almost blank subframe (ABS) standardized by LTE in order to assign the null period to the frame of the signal transmitted in the Scell. The ABS is a technology for causing the base station apparatus (or the terminal apparatus) to reduce a part of the transmit power of the physical channel (for example, PDSCH or PDCCH) in a part of the subframes or to stop the transmission in order to mainly suppress the interference between the neighboring cells. The frame control unit 1031 may create the null period by stopping the transmission of a part of the subframes of the frame of the signal transmitted in the Sell or reducing the transmit power through the ABS. The frame control unit 1031 may periodically dispose the null period by periodically applying the ABS to the frame of the signal transmitted in the Scell (for example, every 4 ms).

In the present embodiment, the null period configured by the frame control unit 1031 is not necessarily use for suppressing the interference between the neighboring cells. Thus, in a case where the communication system according to the present embodiment includes a plurality of base station apparatus and each base station apparatus applies the null period to the frame of the signal transmitted in the Scell of the unlicensed band in the ABS, it is not necessary to stagger a timing when the null period is assign to the frame of the signal between neighboring base station apparatus. In order to suppress interfering and being interfered from another system represented by the IEEE 802.11 system, the timing when the null period is assigned to the frame of the signal is appropriately matched between the neighboring base station apparatus.

Meanwhile, the terminal apparatus UE1 and the terminal apparatus UE2 perform the demodulation process on the signal transmitted in the unlicensed band on the basis of the information indicating the frame structure of the signal transmitted in the Scell of the unlicensed band signaled by the base station apparatus 1. In this case, the PDCCH monitoring unit 2042 may stop monitoring the control information during the null period assigned to the frame of the signal transmitted in the Scell. In a case where the base station apparatus 1 transmits only the synchronization channel during the null period, the PDCCH monitoring unit 2042 may perform only the synchronization process during the null period.

The frequency band in which the base station apparatus 1 according to the present embodiment performs the CA is not limited to the licensed band or the unlicensed band described above. The frequency band as a target of the present embodiment includes a frequency band (for example, a frequency band which is allocated for television broadcasting but is not used by the locality) called a white band that is not used in reality in order to prevent the crosstalk between frequencies even though the permission for use of a specific service is gained by a country or a locality, or a shared frequency band which is exclusively allocated to a specific operator but is expected to be shared between a plurality of operators in the future. For example, a case where the base station apparatus 1 configures the Pcell for the licensed band and configures the Scell for a part of the white band is also included in the present embodiment. The frame control unit 1031 may change the structure of the frame of the signal of the Scell depending on the frequency band in which the base station apparatus 1 configures the Scell.

In accordance with the method according to the present embodiment, the base station apparatus 1 can assign the null period to the frame of the signal transmitted in the Scell of the unlicensed band. Each apparatus included in the communication system can also perform communication on the basis of a communication method (for example, CSMA/CA) of another system during the null period. Accordingly, since a specific apparatus does not occupy the unlicensed band during a long period, the base station apparatus 1 can improve the throughput of the communication system through the CA using the unlicensed band while minimizing the influence on another system.

[Second Embodiment]

Similarly to the first embodiment, it is also assumed in the present embodiment that the terminal apparatus UE1 and the terminal apparatus UE2 are coupled with the base station apparatus 1 as the Pcell and the frequency band to be used is the licensed band.

Figure 5:
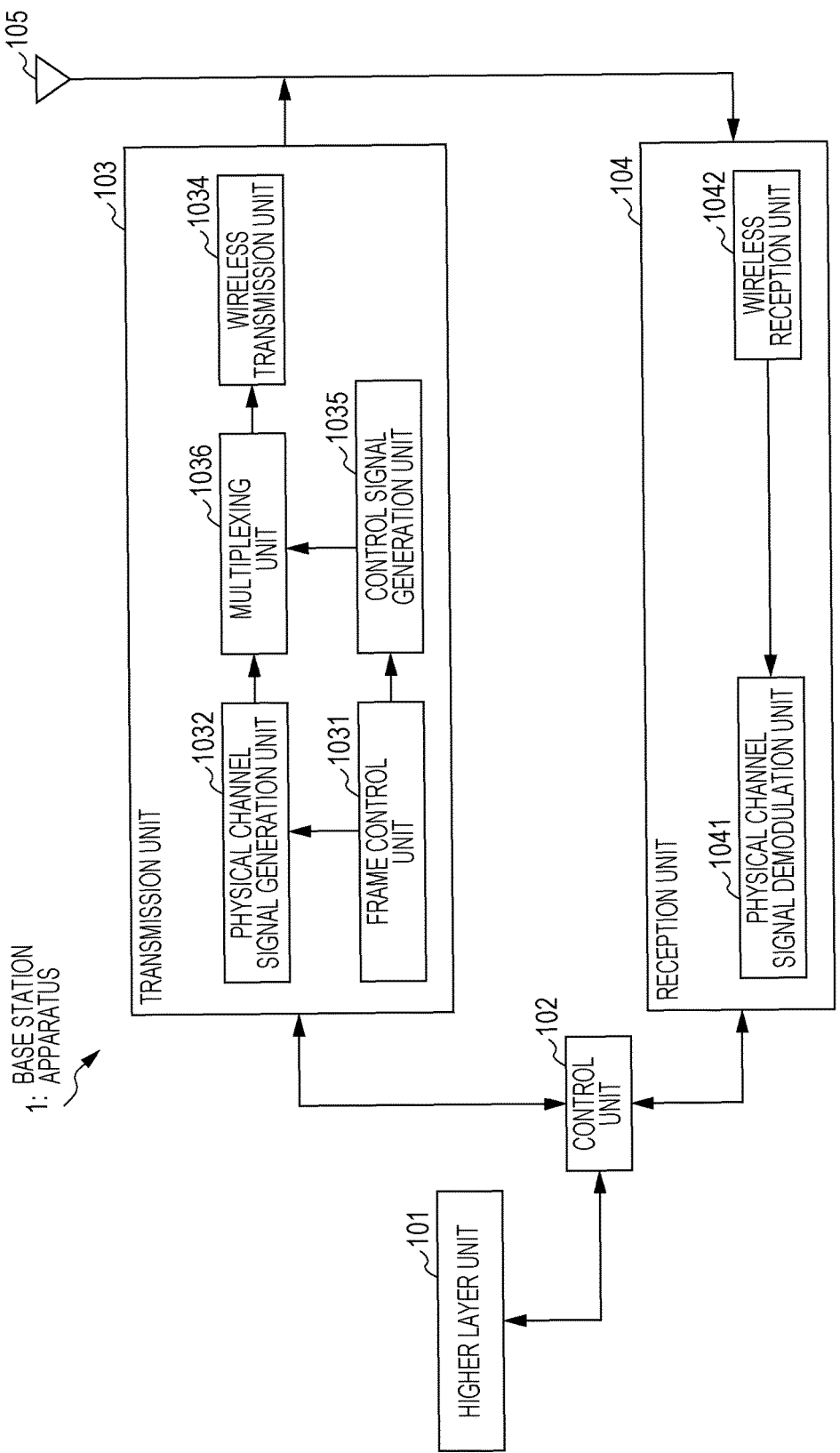
FIG. 5 is a schematic block diagram illustrating a structure example of the base station apparatus according to the present invention.

FIG. 5 is a block diagram illustrating a structure example of the base station apparatus 1 according to the present embodiment. The base station apparatus 1 according to the present embodiment has a difference from the base station apparatus 1 according to the first embodiment in that the transmission unit 103 further includes a control signal generation unit 1035 and a multiplexing unit 1036. It is assumed that the outline of the communication system according to the present embodiment and the structures of the terminal apparatus UE1 and the terminal apparatus UE2 are the same as those of the first embodiment.

The control signal generation unit 1035 generates a signal including control information (for example, control information transmitted through the PDCCH of the Pcell and the Scell) transmitted to the terminal apparatus UE1 and the terminal apparatus UE2 from the base station apparatus 1. The multiplexing unit 1036 multiplexes the signal generated by the physical channel signal generation unit 1031 and the signal generated by the control signal generation unit 1035.

Similarly to the first embodiment, in the present embodiment, the base station apparatus 1 performs the CA using the unlicensed band as the Scell. The base station apparatus 1 transmits a resource reserving signal for previously reserving the unlicensed band in at least a partial range of the coverage range of this base station apparatus during the null period assigned to the frame of the signal transmitted from the frame control unit 1031 in the Scell.

Figure 4B:
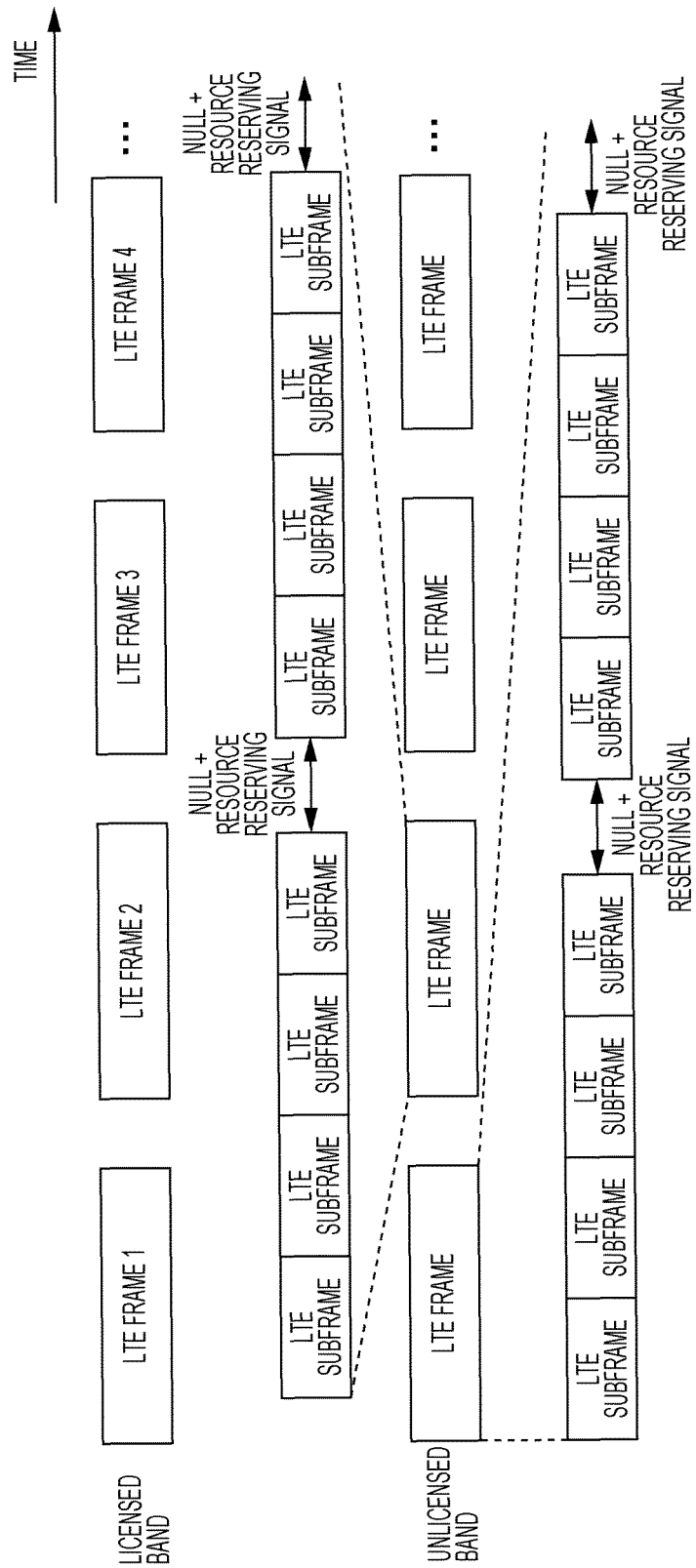
FIG. 4B is a diagram illustrating an example of the frame structure of the signal according to the present invention.

FIG. 4B is a diagram illustrating an example of the frame structure configured by the frame control unit 1031 according to the present embodiment. The signal transmitted from the base station apparatus 1 in the Pcell of the licensed band has the same structure as that of FIG. 4A. Meanwhile, similarly to FIG. 4A, a null period of a predetermined period is assigned in the frame structure of the signal transmitted in the Scell of the unlicensed band configured by the frame control unit 1031, but the frame control unit 1031 assigns a period (radio resource) during which the resource reserving signal is transmitted to the unlicensed band to the null period. By controlling the period in this manner, the base station apparatus 1 can reserve the unlicensed band during the period later than the null period.

The resource reserving signal transmitted from the base station apparatus 1 according to the present embodiment is not particularly limited. For example, the base station apparatus can generate the resource reserving signal and transmit the generated resource reserving signal on the basis of an interference protection technology used in the IEEE 802.11 system.

In the CSMA/CA adopted by the IEEE 802.11 system, autonomous multi-access is realized by performing communication in a case where each terminal apparatus performs the carrier sense and interference is not measured. However, since there are limitations in a distance (referred to as a carrier sense area) at which the carrier sense can be performed, two terminal apparatuses that are away from their carrier sense areas simultaneously transmit the signals, so that interference may be caused in the other terminal apparatus in some cases. Thus, several interference protection technologies are adopted by the IEEE 802.11 system.

In Request-to-Send/Clear-to-Send (RTS/CTS), a terminal apparatus that desires to transmit the signal transmits the RTS to a terminal apparatus as a transmission destination. If the terminal apparatus as the destination of the RTS performs the carrier sense after receiving the RTS and the interference is not measured (observed), this terminal apparatus transmits the CTS to the terminal apparatus that transmits the RTS. In this case, a terminal apparatus other than the terminal apparatus as the destination of the RTS that receives the RTS and a terminal apparatus other than the terminal apparatus as the destination of the CTS that receives the CTS stop transmitting packets during a previously configured period of the network allocation vector (NAV). Accordingly, in the carrier sense of at least the terminal apparatus as the destination of the RTS and the terminal apparatus as the destination of the CTS, interference does not occur.

Meanwhile, CTS-to-self is a function of causing the terminal apparatus that desires to transmit the signal to transmit the CTS to this terminal apparatus itself. As described above, since the terminal apparatus other than the terminal apparatus as the destination of the CTS that receives the CTS stops transmitting the packet between the NAVs, the terminal apparatus transmits the CTS-to-self, so that the interference from at least an area where the CTS-to-self reaches does not occur.

Thus, the control signal generation unit 1035 according to the present embodiment generates the CTS-to-self as the resource reserving signal. The multiplexing unit 1036 multiplexes the resource reserving signal generated by the control signal generation unit 1035 and the signal generated by the physical channel signal generation unit 1032 such that these signals are allocated to the radio resources in which the resource reserving signal configured by the frame control unit 1031 is transmitted. The control signal generation unit 1035 may transmit the RTS or the CTS as the resource reserving signal instead of the CTS-to-self. In the RTS or the CTS (including the CTS-to-self), since a value of the NAV can be notified to the apparatus capable of receiving the RTS (or the CTS), the control signal generation unit 1035 can describe the value of the NAV as the RTS (or the CTS) on the basis of the number of subframes transmitted after the null period in a case where the RTS or the CTS is generated as the resource reserving signal.

If the timing when the resource reserving signal configured by the frame control unit 1031 is transmitted is not limited as long as this timing is within the null period, and is preferably configured such that at least the base station apparatus 1 can perform the carrier sense during the null period. In a case where the control signal generation unit 1035 generates the CTS-to-self as the resource reserving signal, it is assumed that the next signal is transmitted after a short interframe space (SIFS) period after the reception of the CTS is completed in the IEEE 802.11 system. This indicates that the frame control information 1031 can also control a transmission timing of the LTE subframe transmitted after the resource reserving signal is transmitted by controlling a transmission timing of the resource reserving signal. For example, the frame control information 1031 can also control the transmission timing of the resource reserving signal so as to improve synchronization accuracy between the frame of the signal transmitted in the Pcell and the frame of the signal transmitted in the Scell.

FIG. 6 is a schematic diagram illustrating an example of a method of transmitting the resource reserving signal during the null period according to the present embodiment. The wireless reception unit 1042 or the physical channel signal demodulation unit 1941 of the base station apparatus 1 starts the carrier sense in the unlicensed band simultaneously with the starting of the null period of the frame during which the transmission in the Scell of the unlicensed band is performed. In a case where it is determined that the unlicensed band can be reserved, the frame control unit 1031 determines the transmission timing of the resource reserving signal such that a resource reserving signal transmission period and a period after a SIFS period become a transmission starting timing of the LTE subframe transmitted from the base station apparatus 1 in the Pcell of the licensed band. In a case where the control signal generation unit 1035 generates an appropriate signal (may be a signal such as impulse signal) as the resource reserving signal, the frame control unit 1031 may determine the transmission timing of the resource reserving signal such that the resource reserving signal transmission and a period after a distributed coordination function IFS (DIFS) period become the a transmission starting time of the LTE subframe transmitted from the base station apparatus 1 in the Pcell of the licensed band. By controlling the period in this manner, the base station apparatus 1 can more efficiently reserve the radio resource, and can synchronize the LTE frame transmitted in the Pcell of the licensed band and the LTE frame transmitted in the Scell of the unlicensed band with high accuracy.

The frame control unit 1031 may perform the transmission timing of the resource reserving signal illustrated in FIG. 6 during all the null periods. The frame control unit 1031 may control such that the resource reserving signal is transmitted during the null period and also such that the leading LTE frames transmitted in the Pcell and the Scell are synchronized, or the frame control unit 1031 may adaptively determine the null period during which the resource reserving signal is transmitted. For example, in a case where the frame control unit 1031 requires the synchronization of the LTE frames transmitted in the Pcell and the Scell (for example, a case where the base station apparatus 1 transmits the control information in order to demodulate the control information of the PDSCH of the Scell by using the PDCCH of the Pcell), the frame control unit may control such that the resource reserving signal is transmitted during the null period.

In accordance with the method according to the present embodiment, the base station apparatus 1 can transmit the resource reserving signal in the unlicensed band during the null period assigned to the frame of the signal transmitted in the Scell of the unlicensed band. Accordingly, since the unlicensed band can be more efficiently reserved, the base station apparatus 1 can improve the throughput of the communication system through CA using the unlicensed band.

[Third Embodiment]

Similarly to the first embodiment, it is also assumed in the present embodiment that the terminal apparatus UE1 and the terminal apparatus UE2 are coupled with the base station apparatus 1 as the Pcell and the frequency band to be used is the licensed band. It is assumed that the outline of the wireless communication system, the structure of the base station apparatus 1, and the structures of the terminal apparatus UE1 and the terminal apparatus UE2 according to the present embodiment are the same as those of the first embodiment.

Similarly to the first embodiment, in the present embodiment, the base station apparatus 1 performs CA using the unlicensed band as the Scell. The null period is assigned to the frame of the signal transmitted from the base station apparatus 1 in the Scell. It is assumed that the wireless reception unit 1042 or the physical channel signal demodulation unit 1041 performs the carrier sense in the unlicensed band during the null period.

In a case where the base station apparatus 1 is not able to reserve the unlicensed band as the result of the carrier sense during the null period, the base station apparatus 1 does not transmit the signal in the Scell of the unlicensed band after the null period. Meanwhile, the base station apparatus 1 can continue to transmit the signal in the Pcell of the licensed band irrespective of the result of the carrier sense of the unlicensed band. In this case, there is a problem that the number of frames of the signal transmitted from the base station apparatus 1 in the Pcell of the licensed band and the number of frames of the signal transmitted in the Scell of the unlicensed band are different.

Thus, in the present embodiment, the frame control unit 1031 measures the number of frames of the signal irrespective of the result of the carrier sense performed during the null period assigned to the frame transmitted from the base station apparatus 1 in the Scell of the unlicensed band.

FIG. 4C is a diagram illustrating an example of the frame structure configured by the frame control unit 1031 according to the present embodiment. The signal transmitted from the base station apparatus 1 in the Pcell of the licensed band has the same structure as that of FIG. 4A. Similarly to FIG. 4A, in the frame structure of the signal transmitted in the Scell of the unlicensed band configured by the frame control unit 1031, a null period of a predetermined length (1 ms) is assigned for every a predetermined period (every 4 ms). The wireless reception unit 1042 or the physical channel signal demodulation unit 1041 performs the carrier sense in the unlicensed band during each null period. FIG. 4C illustrates a case where the base station apparatus 1 is not able to reserve the unlicensed band during Period 1 and Period 2 as an example of the result of the carrier sense and another base station apparatus (for example, STA 4 or STA 5) performs communication in the unlicensed band. It is assumed that a no-transmission period of the signal transmitted in the Scell of the unlicensed band originally configured by the frame control unit 1031 is referred to as the null period and a no-transmission period occurring as the result due to the use of the unlicensed band by another system is referred to as an idle period in the present embodiment.

In this case, the LTE frame is able to be transmitted during Period 1 and Period 2 in the unlicensed band, and the frame control unit 1031 counts up a frame number (system frame number (SFN)). In FIG. 4C, LTE frame n indicates that the SFN is n. For example, LTE frame 1 indicates that the SFN is 1.

In the LTE system, since one LTE frame (a periodicity of 10 ms) includes 10 LTE subframes, if 10 LTE subframes are transmitted, the frame control unit 1031 increases the SFN by 1.

However, in FIG. 4C, in the case of the signal transmitted in the Scell of the unlicensed band, since another system uses the unlicensed band during Period 1, only four LTE subframes are transmitted during the first periodicity of 10 ms. Even in this case, the frame control unit 1031 counts up the SFN so as to match with the SFN of the signal transmitted in the Pcell of the licensed band. Thus, the unlicensed band after the idle period can be reserved through the carrier sense of the base station apparatus 1 during the idle period after the communication is performed by the another system, and the SFN of the signal transmitted in the Scell of the unlicensed band becomes 2. That is, in accordance with the method according to the present embodiment, the frame control unit 1031 can increase the SFN assigned to the frame transmitted in the Scell of the unlicensed band at a timing when the SFN assigned to the frame transmitted in the Pcell of the licensed band during the period is increased irrespective of whether or not the base station apparatus 1 transmits the signal in the Scell in reality. Accordingly, the base station apparatus 1 can set the SFN of the signal transmitted in the Pcell to be the same as the SFN of the signal transmitted in the Scell.

The base station apparatus 1 can reserve the unlicensed band for a period during which the base station apparatus 1 transmits the LTE frame 2 in the Pcell of the licensed band, but the number of LTE subframes capable of being transmitted from the base station apparatus 1 in the Scell of the unlicensed band does not reach 10 due to the null period assigned by the frame control unit 1031. Even in this case, the frame control unit 1031 controls the SFN of the frame transmitted from the base station apparatus 1 in the Scell of the unlicensed band during this period so as to become 2.

Since the unlicensed band is used by another system over the entire period for a period during which the base station apparatus 1 transmits the LTE frame 3 in the Pcell of the licensed band, the base station apparatus 1 is not able to transmit the signal in the Scell of the unlicensed band. Even in this case, the frame control unit 1031 controls the SFN of the frame on the assumption that the base station apparatus 1 transmits the LTE frame of which the SFN is 3 in the Scell of the unlicensed band during this period. The frame control unit 1031 performs the same process for a period during which the base station apparatus 1 transmits the LTE frame 4 in the Pcell of the licensed band.

The frequency band in which the base station apparatus 1 according to the present embodiment configures the Scell is not limited to the unlicensed band, and includes, for example, a frequency band called a white space or a frequency band shared between the plurality of operators. Since these frequency bands have different performances, the frame control unit 1031 can change the frame structure of the signal of the Scell depending on the frequency band in which the Scell is configured. Here, the performance of the frequency band includes performance characterized by a legal regulation such as an allowable signal burst length in addition to physical performance represented by channel quality. The frame control unit 1031 can change the number of times the LTE frame is transmitted depending on the frequency band in which the Scell is configured. As stated above, the base station apparatus 1 selects the frequency band in which the Scell is configured from the plurality of frequency bands including the unlicensed band, and the frame control unit 1031 can set the SFN of the signal transmitted in the Pcell to match with the SFN of the signal transmitted in the Scell even in a case where the frame control unit 1031 configures the frame structure of the signal of the Scell depending on the frequency band.

In a case where the base station apparatus 1 can use the plurality of frequency bands, the base station apparatus 1 can previously determine priority levels for applying the CS for the plurality of frequency bands. The base station apparatus 1 can previously notify each terminal apparatus of the priority levels through the signaling of the higher layer. The base station apparatus 1 measures the utilization status of the plurality of frequency bands (for example, the base station apparatus 1 can measure an interference power of the frequency band by performing the carrier sense), and can determine the frequency band among the plurality of frequency bands, which is used in CA based on the measurement result. The base station apparatus 1 can perform the signaling (for example, signaling of the higher layer or signaling due to the PDCCH) of information indicating the frequency band to which CA determined based on the measurement result is applied to each terminal apparatus.

The PDCCH monitoring unit 2042 of the terminal apparatus UE1 and the terminal apparatus UE2 can perform the monitoring of the control signal on the plurality of frequency bands. The PDCCH monitoring unit 2042 of the terminal apparatus UE1 and the terminal apparatus UE2 can perform the monitoring of the control signal on only the previously notified frequency band through the signaling of the higher layer from the base station apparatus 1.

In accordance with the method according to the present embodiment, the base station apparatus 1 can constantly set the SFN of the frame of the signal transmitted in the Pcell of the licensed band to be the same as the SFN of the frame of the signal transmitted in the Scell of the unlicensed band irrespective of the result of reserving the resource of the unlicensed band. Accordingly, since the base station apparatus 1 can easily perform the process such as cross carrier scheduling for transmitting the control information for demodulating the signal transmitted in the PDSCH of the Scell by using the PDCCH of the Pcell, the base station apparatus can perform CA using a part of the unlicensed band as the Scell with higher efficiency.

[Fourth Embodiment]

Similarly to the first embodiment, it is also assumed in the present embodiment that the terminal apparatus UE1 and the terminal apparatus UE2 are coupled with the base station apparatus 1 as the Pcell and the frequency band to be used is the licensed band. It is assumed that the outline of the wireless communication system, the structure of the base station apparatus 1, and the structures of the terminal apparatus UE1 and the terminal apparatus UE2 according to the present embodiment are the same as those of the second embodiment. In the wireless communication system according to the present embodiment, it is assumed that time division duplex (TDD) is used as a duplex scheme.

Similarly to the first embodiment, the base station apparatus 1 performs CA using the unlicensed band as the Scell. The base station apparatus 1 according to the present embodiment allocates a part of the unlicensed band to the Scell of the communication (uplink) from the terminal apparatus to the base station apparatus.

Figure 4D:
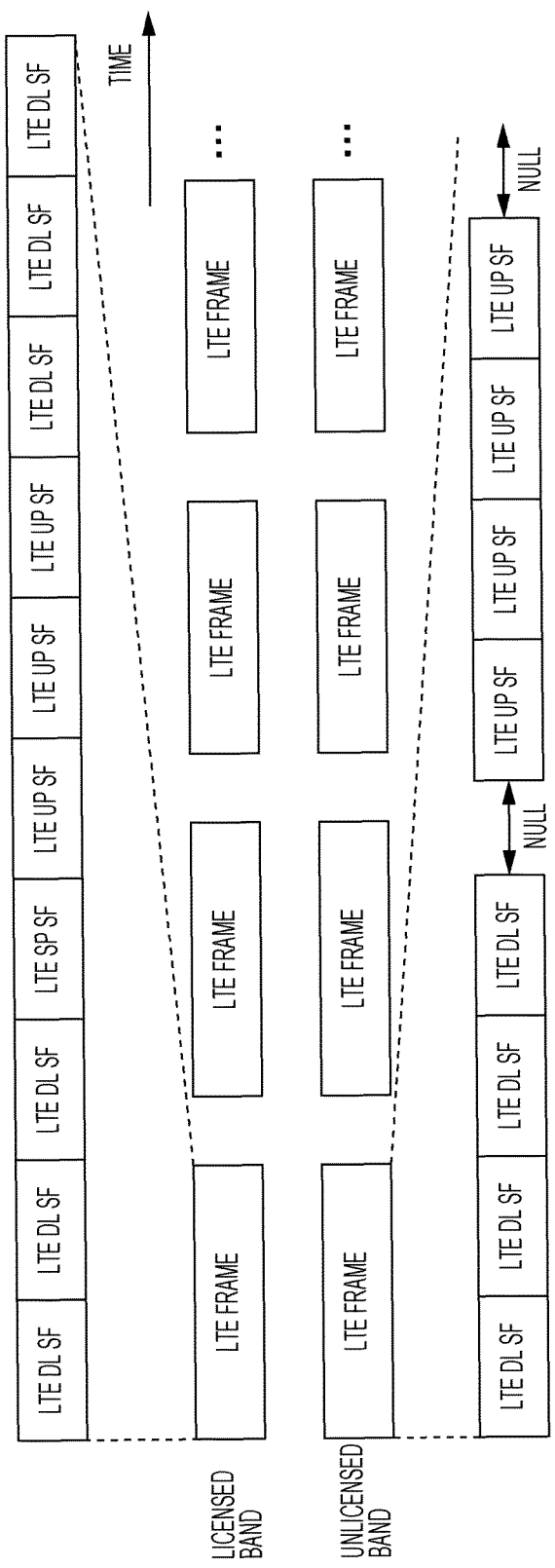
FIG. 4D is a diagram illustrating an example of the frame structure of the signal according to the present invention.

FIG. 4D is a diagram illustrating an example of the frame structure configured by the frame control unit 1031 according to the present embodiment. The frame of the signal transmitted from the base station apparatus 1 in the Pcell of the licensed band includes a downlink subframe (DL SF) in which a downlink signal (for example, a signal transmitted in the PDCCH or the PDSCH) is transmitted, an uplink subframe (UL SF) in which an uplink signal (for example, a signal transmitted in the PUCCH or the PUSCH) is transmitted, a downlink signal and an uplink signal in one subframe, and a special subframe (SP SF) which includes a period during which a transmission timing of the uplink is adjusted. The order or proportion of each of the SFs constituting the frame is not particularly limited, and the frame control unit 1031 may adaptively change the frame structure depending on a channel state between the terminal apparatuses and a data traffic status of the communication system. The frame structure of the signal configured by the frame control unit 1031 is previously notified to each terminal apparatus from the base station apparatus 1 through, for example, the signaling of the higher layer or L1/L2 signaling.

Meanwhile, the frame control unit 1031 configures the no-signal period (null period) as the frame of the signal transmitted from the base station apparatus 1 in the Scell of the unlicensed band in addition to the DL SF or the UL SF. Since the base station apparatus 1, the terminal apparatus UE1, and the terminal apparatus UE2 according to the present embodiment can perform the carrier sense in the unlicensed band during the null period, the unlicensed band can be efficiently reserved. Although the SP SF is not included in the signal transmitted in the Scell in FIG. 4D, it is needless to say that a case where the SP SF is included in the signal transmitted in the Scell is also included in the method according to the present embodiment.

All the respective apparatuses included in the communication system may perform the carrier sense during the null period included in the frame of the signal transmitted in the Scell of the unlicensed band, but only a specific apparatus may perform the carrier sense. For example, only the apparatus that transmits the signal after the null period may perform the carrier sense. In this case, the base station apparatus 1 may perform the carrier sense during the null period configured by the frame control unit 1031 before the DL SF, and the terminal apparatus UE1 and the terminal apparatus UE2 may perform the carrier sense during the null period configured by the frame control unit 1031 before the UL SF.

The base station apparatus 1 may constantly perform the carrier sense during the null period. For example, the base station apparatus 1 may perform the carrier sense during the null period configured by the frame control unit 1031 before the UL SF, and may signal notification indicating that the terminal apparatus UE1 and the terminal apparatus UE2 are permitted to transmit the UL SF after the null period to each terminal apparatus in a case where it is determined that the unlicensed band can be reserved. Similarly to the second embodiment, the base station apparatus 1 may transmit the resource reserving signal (for example, CTS-to-self) for reserving the unlicensed band after the carrier sense. The above-described operations may be performed by the terminal apparatus. That is, the terminal apparatus UE1 may perform the carrier sense in the unlicensed band during the null period, and can signal the permission for use of the unlicensed band after the null period to the respective apparatuses (here, the base station apparatus 1 and the terminal apparatus UE2) in a case where it is determined that the unlicensed band can be reserved.

In a case where the base station apparatus 1, the terminal apparatus UE1, and the terminal apparatus UE2 are not able to reserve the unlicensed band as the result of the carrier sense on the unlicensed band during the null period, the apparatuses do not transmit the DL SF or the UL SF configured by the frame control unit 1031 after the null period. In this case, similarly to the third embodiment, the respective apparatuses may synchronize the SFN of the frame of the signal transmitted in the Scell of the unlicensed band with the SFN of the frame of the signal transmitted in the Pcell of the licensed band irrespective of the transmission state of the DL SF or the UL SF. The terminal apparatus UE1 and the terminal apparatus UE2 may perform the carrier sense, and only the terminal apparatus UE1 may transmit the UL SF in a case where only the terminal apparatus UE1 can reserve the unlicensed band.

In accordance with the method according to the present embodiment, even in the wireless communication system that uses the TDD as the duplex scheme, the base station apparatus 1, the terminal apparatus UE1, and the terminal apparatus UE2 can efficiently reserve the unlicensed band. The carrier sense in the unlicensed band may be performed by only the base station apparatus 1, and thus, the complexity of the terminal apparatus 1 and the terminal apparatus UE2 can be reduced.

[Common to all Embodiments]

The programs operated in the base station apparatus and the terminal apparatuses according to the present invention may be programs (programs causing a computer to function) for controlling a CPU such that the functions of the above-described embodiments according to the present invention are realized. The information items treated by these apparatuses are temporally accumulated in a RAM during the processing, are stored in various ROMs or HDDs, are read by the CPU if necessary, and are modified and rewritten. Here, as a recording medium that stores the programs, any one of a semiconductor medium (for example, ROM or non-volatile memory card), an optical recording medium (for example, DVD, MO, MD, CD, and BD), a magnetic recording medium (for example, magnetic tape and flexible disk) may be used. Not only the functions of the above-described embodiments may be realized by executing the loaded program, but also the functions of the present invention may be realized by processing the loaded program in cooperation with an operating system or another application program based on an instruction of the program.

In a case where the program is distributed to the market, the program may be distributed while being stored in a portable recording medium, and may be transmitted to a server computer coupled via a network such as the Internet. In this case, a storage device of the server computer may also be included in the present invention. Some or all of the terminal apparatuses and the base station apparatus of the above-described embodiments may be typically realized as large scale integration (LSI) which is integrated circuit. The functional blocks of the terminal apparatuses and the base station apparatus may be separately realized as chips, or some or all thereof may be integrated and realized as chips. In a case where the respective functional blocks are realized as the integrated circuits, an integrated circuit control unit for controlling these circuits is provided.

The method of realizing the functional blocks as the integrated circuit is not limited to the LSI, and the functional blocks may be realized as a dedicated circuit or a general-purpose processor. Alternatively, some of the dedicated circuits are realized as general-purpose processors, and some of the respective processes or functions are realized using the general-purpose processors and are realized by both a dedicated circuit unit and a software process. In a case where a technology of realizing the apparatuses or functional blocks as the integrated circuit has appeared instead of the LSI due to the advance of semiconductor technology, it is possible to use an integrated circuit produced using this technology.

The present invention is not limited to the above-described embodiments. The terminal apparatus according to the present invention is not limited to the application to a mobile station apparatus, and may be applied to stationary or non-movable electronic devices which are installed indoors or outdoors, such as AV devices, kitchen devices, cleaning and washing machines, air conditioners, office devices, vending machines, and other home appliances.

The embodiments of the present invention have been described with reference to the drawings. However, the detailed structure is not limited to the above-described embodiments, and changes in the design within the gist of the invention may also be included in the claims.

Industrial Applicability

The present invention is suitable for a base station apparatus, a terminal apparatus, and a communication method.

The present international application claims priority based on Japanese Patent Application No. 2014-122302 filed on Jun. 13, 2014, and the entire content of Japanese Patent Application No. 2014-122302 is incorporated by reference in the present international application.

Reference Signs List

1 Base station apparatus
UE1, UE2 Terminal apparatus
4,5 STA
101, 201 Higher layer unit
102, 202 Control unit
103, 203 Transmission unit
104, 204 Reception unit
105, 205 Antenna
1031 Frame control unit
1032, 2031 Physical channel signal generation unit
1034, 2032 Wireless transmission unit
1035 Control signal generation unit
1036 Multiplexing unit
1041, 2041 Physical channel signal demodulation unit
1042, 2043 Wireless reception unit
2042 PDCCH monitoring unit

The invention claimed is:

1. A base station apparatus which communicates with a terminal apparatus, the base station apparatus comprising:
a transmission unit that transmits a downlink signal to the terminal apparatus by performing carrier aggregation using one primary cell and one or a plurality of secondary cells,
wherein the primary cell is a component carrier of a licensed band, and at least one secondary cell is a component carrier of an unlicensed band,
a frame of the component carrier of the licensed band includes a transmission period of the downlink signal,
a frame of the component carrier of the unlicensed band includes a transmission period of the downlink signal and a null period during which the base station apparatus does not transmit a signal,
the component carrier of the unlicensed band includes a plurality of frame structures, and
priorities are configured for the plurality of frame structures.

2. The base station apparatus according to claim 1,
wherein the transmission period during which the downlink signal of the unlicensed band is transmitted includes a plurality of continuous subframes, and
the number of the plurality of continuous subframes in the unlicensed band is equal to or less than the number of a plurality of subframes in the licensed band.

3. The base station apparatus according to claim 1,
wherein the downlink signal includes downlink control information, and
the downlink control information includes information indicating a position of the null period.

4. The base station apparatus according to claim 1,
wherein at least one subframe of the plurality of subframes includes a transmission period and a null period.

5. The base station apparatus according to claims 1, further comprising:
a reception unit that performs carrier sense during the null period,
wherein the transmission unit transmits the downlink signal after carrier sense in the component carrier of the unlicensed band is performed.

6. A terminal apparatus that communicates with a base station apparatus, the terminal apparatus comprising:
a reception unit that receives a downlink signal from the base station apparatus by performing carrier aggregation using one primary cell and one or a plurality of secondary cells,
wherein the primary cell is a component carrier of a licensed band, and at least one secondary cell is a component carrier of an unlicensed band,
a frame of the component carrier of the licensed band includes a transmission period of the downlink signal,
a frame of the component carrier of the unlicensed band includes a transmission period of the downlink signal and a null period during which the terminal apparatus does not transmit a signal,
the component carrier of the unlicensed band includes a plurality of frame structures, and
priorities are configured for the plurality of frame structures.

7. A communication method used in a base station apparatus that communicates with a terminal apparatus, the communication method comprising:
a transmission step of transmitting a downlink signal to the terminal apparatus by performing carrier aggregation using one primary cell and one or a plurality of secondary cells,
wherein the primary cell is a component carrier of a licensed band, and at least one secondary cell is a component carrier of an unlicensed band,
a frame of the component carrier of the licensed band includes a transmission period of the downlink signal,
a frame of the component carrier of the unlicensed band includes a transmission period of the downlink signal and a null period during which the base station apparatus does not transmit a signal,
the component carrier of the unlicensed band includes a plurality of frame structures, and
priorities are configured for the plurality of frame structures.

8. A communication method used in a terminal apparatus that communicates with a base station apparatus, the communication method comprising:
a reception step of receiving a downlink signal from the base station apparatus by performing carrier aggregation using one primary cell and one or a plurality of secondary cells, wherein the primary cell is a component carrier of a licensed band, and at least one secondary cell is a component carrier of an unlicensed band, a frame of the component carrier of the licensed band includes a transmission period of the downlink signal, a frame of the component carrier of the unlicensed band includes a transmission period of the downlink signal and a null period during which the terminal apparatus does not transmit a signal, the component carrier of the unlicensed band includes a plurality of frame structures, and priorities are configured for the plurality of frame structures.

* * * * *